(12) United States Patent
Rotman et al.

(10) Patent No.: US 11,919,732 B2
(45) Date of Patent: Mar. 5, 2024

(54) LEVELING FOR A MEDIA POSITIONING ARRANGEMENT OF A TOP FEEDER OF A PRINTER

(71) Applicant: HP SCITEX LTD., Netanya (IL)

(72) Inventors: Ziv Rotman, Netanya (IL); Osher Elimelech, Netanya (IL); Yaron Dekel, Netanya (IL); Majd Nasser, Netanya (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 17/579,729

(22) Filed: Jan. 20, 2022

(65) Prior Publication Data
US 2022/0250864 A1    Aug. 11, 2022

(30) Foreign Application Priority Data

Feb. 9, 2021    (EP) ..................................... 21155939

(51) Int. Cl.
| | |
|---|---|
| *B65H 1/14* | (2006.01) |
| *B65H 1/04* | (2006.01) |
| *B65H 1/08* | (2006.01) |
| *B65H 9/20* | (2006.01) |
| *B65H 11/02* | (2006.01) |
| *H04N 13/254* | (2018.01) |

(52) U.S. Cl.
CPC ............... *B65H 11/02* (2013.01); *B65H 1/04* (2013.01); *B65H 9/20* (2013.01); *H04N 13/254* (2018.05)

(58) Field of Classification Search
CPC ... B65H 1/14; B65H 1/18; B65H 1/08; B65H 1/04; B65H 11/02; B65H 9/20; B65H 2553/42; B65H 2511/15; B65H 43/08; B65H 7/02; B65H 7/42; B65H 7/14; B65H 2511/23
See application file for complete search history.

(56) References Cited

U.S. PATENT DOCUMENTS

| | | |
|---|---|---|
| 5,098,080 A | 3/1992 | Arnone et al. |
| 5,622,364 A | 4/1997 | Dutton et al. |
| 6,254,084 B1 | 7/2001 | Hellmer |
| 6,874,780 B2 | 4/2005 | Rebeaud |
| 7,690,248 B2 | 4/2010 | Moore |
| 8,191,889 B1 | 6/2012 | Cummings |

(Continued)

FOREIGN PATENT DOCUMENTS

| | | |
|---|---|---|
| CN | 112004685 A | 11/2020 |
| JP | 2005041678 A * | 2/2005 |

(Continued)

*Primary Examiner* — Luis A Gonzalez

(57) ABSTRACT

Examples include: a leveling system for a top feeder of a printer, where the top feeder includes a media positioning arrangement. The leveling system has a detector for detecting reflected light and generating a three-dimensional image comprising media positioning regions corresponding to the media positioning arrangement on a top sheet of a media stack installed into the top feeder. Also, the leveling system has an actuator configured to adjust heights of different points of the bottom of the media stack. Further, it has a controller for selecting, based on the three-dimensional image, adjustments to the heights for improving leveling of at least one of the media positioning regions; and controlling the actuator to implement the adjustments.

15 Claims, 8 Drawing Sheets

FIG. 1A

(56) References Cited

U.S. PATENT DOCUMENTS

| | | | |
|---|---|---|---|
| 8,348,259 B2 * | 1/2013 | Marasco | B65H 7/00 |
| | | | 271/148 |
| 9,102,055 B1 | 8/2015 | Konolige et al. | |
| 10,414,607 B2 | 9/2019 | Wick | |
| 2003/0102623 A1 | 6/2003 | Hirai | |
| 2007/0098475 A1 | 5/2007 | Stenzel et al. | |
| 2010/0038843 A1 | 2/2010 | Marasco et al. | |
| 2014/0253717 A1 | 9/2014 | Adelson et al. | |
| 2016/0347558 A1 | 12/2016 | Eto | |
| 2021/0168244 A1 | 6/2021 | Quintana et al. | |
| 2022/0033210 A1 | 2/2022 | Sakai | |

FOREIGN PATENT DOCUMENTS

| | | | |
|---|---|---|---|
| JP | 2006-298606 A | | 11/2006 |
| JP | 2009-007111 A | | 1/2009 |
| JP | 2011241013 A | * | 12/2011 |
| JP | 2016-222377 A | | 12/2016 |
| WO | 2020/188817 A1 | | 9/2020 |

\* cited by examiner

LEVELING FOR A MEDIA POSITIONING ARRANGEMENT OF A TOP FEEDER OF A PRINTER

BACKGROUND

This disclosure generally relates to preparing a top sheet of a media stack for being accepted by a media positioning arrangement of a top feeder of a printer.

Generally, a media stack should be appropriately formed and positioned for feeding to a printer. For example, a media stack can be a stack of corrugated boards. Such boards are used in packaging and display applications due to their rigidity, low production cost and recyclability.

DETAILED DESCRIPTION

Figure 1A:
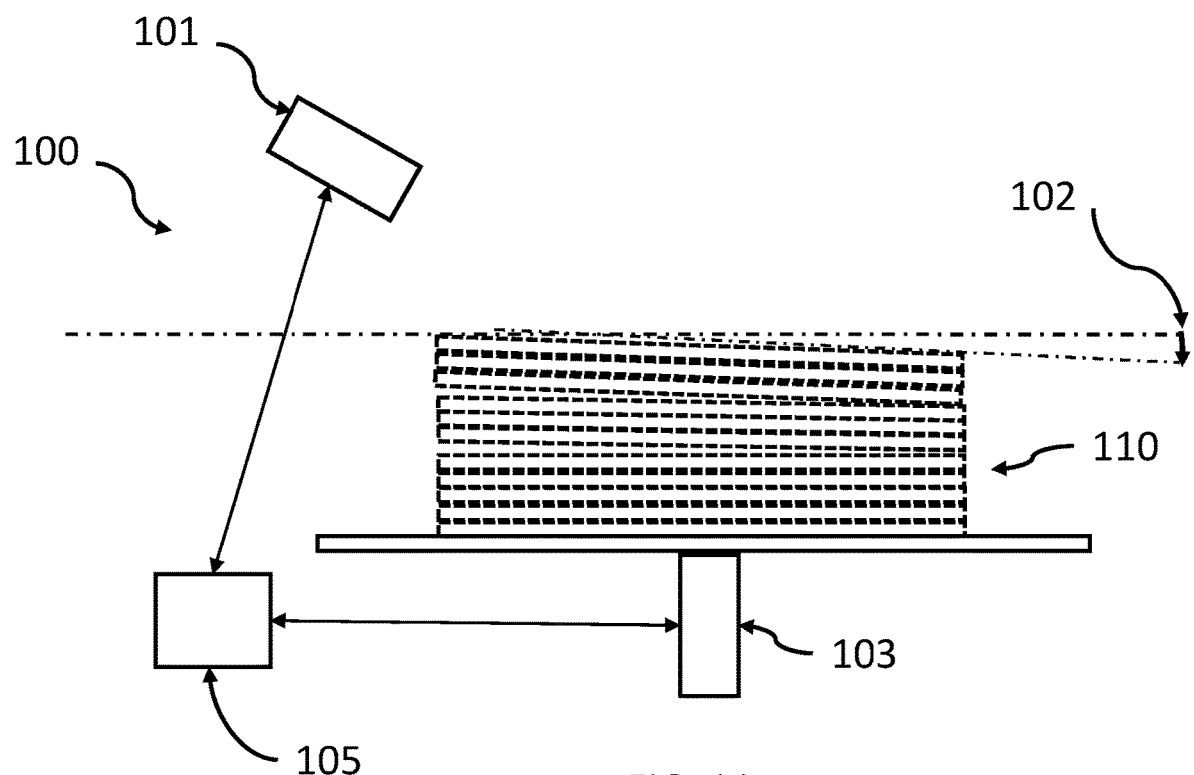
FIG. 1A is a schematic diagram of an example leveling system.

One of printing technologies for printing on corrugated boards is flexography, often abbreviated to "Flexo". Flexography is also used for printing on media of other types, including plastic, metallic films, cellophane, and paper. Some Flexo presses allow printing at speeds of, for example, about or up to 4 linear meters per second. Certain special bottom feeders and pre-feeders have been developed to support these speeds. Some of these feeding devices are long (for example, about or up to 15 m) and relatively heavy.

Also, there are digital presses capable of, for example, printing directly on cardboards and using inkjet technology. One of the examples is Hewlett Packard's C500 model.

These flexo printers, digital presses and other printers can use a top feeder, where the media is fed from the top of the stack. Top feeders can be relatively compact and inexpensive. Also, some top feeders can be used for feeding relatively rarely used media, such as thin micro flute materials, to a printer.

Top feeders have media positioning arrangements for moving a top sheet of the media stack to a printer. In some examples, such a media positioning arrangement can include roller, grippers, a vacuum belt or a vacuum gripper to raise a top sheet of the media stack and pass it within the feeder or feed it into the printing device. The media positioning arrangement can fail to perform this correctly if the top sheet of the media stack is warped or is not at an appropriate position.

In cases where the top sheet of the media stack is not in an appropriate position, and thereby may not be appropriately fed in the printer, the printing operation is interrupted, and an upper part of the media stack can be repositioned by a human operator to resume printing by inserting wooden shims between edges of some sheets in the media stack. Such interruption in the printing process is however time consuming and involves human intervention by an operator with a specialized training or expertise for safely performing such operations.

Leveling of the stack surface can change during the printing process, i.e. when top sheets are taken one-by-one from the stack. For example, leveling of the next top sheet can be different from previous top sheet due to warps of these sheets being different. Accordingly, more than one interruption is possible when printing on media from a same stack.

The present disclosure aims at resolving or reducing such printing interruptions due to a media stack not being positioned appropriately.

The present disclosure relies on providing a leveling system permitting detecting mispositioning of a top sheet of a media stack and correcting such mispositioning. It was indeed found that leveling of a top sheet of a media stack may be improved by adjusting heights of different points at the bottom of the media stack, with respect to each other. Such leveling may be used with or without some other leveling techniques, for example, decurving. According to the present disclosure, in many cases such leveling can make a difference allowing a media positioning arrangement of a top feeder of a printer to move the top sheet of the media stack to the printer, i.e. decrease a probability of printing failure or printing interruption.

Figure 1B:
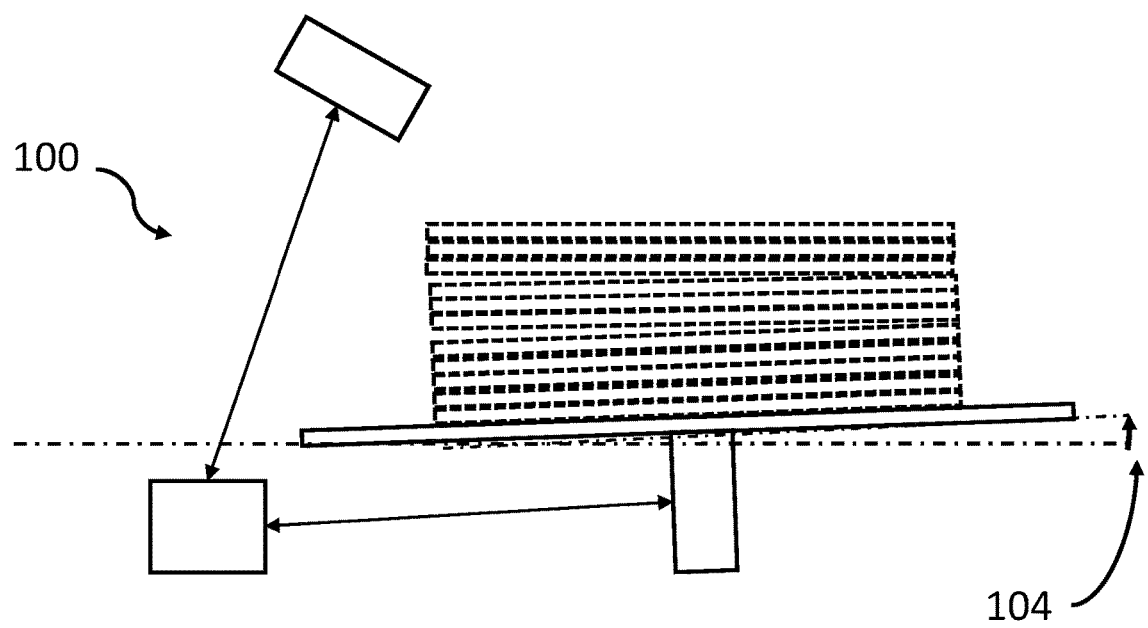
FIG. 1B is another schematic diagram of the example leveling system of FIG. 1A.

FIGS. 1A and 1B illustrate an example leveling system 100 for a top feeder of a printer (not represented in FIGS. 1A-B). A leveling system according to this disclosure should be understood as a system comprising mechanical elements permitting changing the orientation of a stack of media aimed at being fed into a printer through a top feeder, in particular using a media positioning arrangement of the top feeder.

The example leveling system 100 comprises a detector 101 configured to detect reflected light and generate a three-dimensional image or representation comprising media positioning regions corresponding to the media positioning arrangement, the light being reflected on a top sheet of a media stack 110 installed into the top feeder. Light should be understood in this description as electromagnetic radiation of any wavelength, including for example visible light, infra-red, acoustic or radio waves.

A detector should in this disclosure be understood as a light sensing device. In some examples, the detector is a camera. In some examples, the detector comprises at least one of a 3D camera and two 2D cameras. In some examples, the detector comprises an infra-red camera. In some examples, the detector comprises a visible light camera. In some examples, the detector comprises a radio wavelength sensor. In some examples, the detector comprises a time-of-flight sensor. In some examples, the detector is configured to serve as a detector in a LIDAR detection scheme. In some examples, the lidar detection scheme is "incoherent" or based on direct energy detection. In some examples, the lidar detection scheme is coherent.

The detector is configured to detect reflected light. Such reflected light, in particular light reflected from a surface of the top sheet of the media stack, can indeed provide an indication as to the position of such top sheet. In some examples, the detector is oriented towards a top sheet of the media stack.

The detector is to generate a three-dimensional image. Such three-dimensional image may for example be produced by combining different two-dimensional images of a same object, such object being in this case the top sheet. The three-dimensional image permits obtaining a representation of the top surface of the top sheet. "Top" in this disclosure should be understood in relation to gravity.

The three-dimensional image comprises media positioning regions. Such regions should be understood as surface areas relevant to the positioning of the media. In some examples, such regions take a specific geometrical shape such as, for example, a circle, an ellipse, a rectangle, a parallelogram or a polygonal figure. Such regions correspond to the media positioning arrangement of the top feeder. Due to the fact that a top feeder may take different shapes or forms, the correspondence between the media positioning regions and the media positioning arrangement may be a direct correspondence, an indirect correspondence, or a combination of both. In the case of a direct correspondence, the media positioning regions may for example at least partially coincide with regions of the media which will be in direct contact with the media positioning arrangement. If, for example, the media positioning arrangement of the top feeder comprises a vacuum fan gripping media in a central circular region of the media, a media positioning region may directly coincide with the central circular region. In the case of an indirect correspondence, the media positioning region may differ from a region or regions of the media which will be in direct contact with the media positioning arrangement, while being related to such region or regions of the media which will be in direct contact with the media positioning arrangement. If, for example, the media positioning arrangement of the top feeder comprises an input window, into which the leading edge of the media has to fit in, or pick up rollers picking up the leading edge of media, a media positioning region may in some cases correspond to a region in the vicinity of such leading edge. Such leading edge region does not necessarily comprise the leading edge: in some examples it is indicative of the location of the leading edge without comprising it. Leading edge should be understood as the edge first entering the printer when the sheet is being processed by the printer.

The detector 101 is to detect reflected light on the top sheet of a media stack installed into the top feeder. A media stack should be understood as a pile of different sheets of media. In some examples, the different sheets have a similar size. In some examples, the sheets forming the media stack are lying in a plane generally normal to the direction of gravity. In some examples, the media stack comprises more than 10 sheets. In some examples, the media stack comprises more than 100 sheets. In some examples, the media stack is more than 50 cm high. In some examples, the media stack is more than 1 m high. In some example, each sheet has a thickness of more than 1 mm. In some examples, each sheet has a thickness of more than 5 mm. It should be understood that the thicker the sheets, and the higher the media stack, the more likely it is that the top sheet may deviate from a plane normal to the direction of gravity. FIG. 1A illustrates an example deviation angle 102 of a top sheet. The three-dimensional image generated by the detector permits for example detecting such a deviation angle. It should be understood that the deviation from a plane normal to gravity may apply to one or more parts of a top sheet or to an entire top sheet. The media stack is installed into the top feeder (not represented in FIGS. 1A-B), whereby such media stack is meant to being fed to the printer.

Example leveling system 100 comprises an actuator 103. An actuator should be understood as a mechanical device or assembly configured to adjust heights of different points of the bottom of the media stack. In some examples, the actuator comprises an actuating element such as a ball joint. In some examples, the actuator comprises one or more of a lever, gear or piston. As illustrated in FIG. 1B, the actuator 103 may modify the orientation of the bottom of the media stack to by, for example, an angle 104 compensating the angle 102 of FIG. 1A (FIGS. 1A and 1B represent the same example leveling system in different configurations). The heights of the different points of the bottom of the media stack may be adjusted by the actuator. In some examples, at least some points of the bottom of the media stack have their heights adjusted by different values, thereby changing a levelling of the media stack, and thereby changing a levelling of the top sheet of the media stack. In some examples, some heights are adjusted by at least a cm. In some examples, some heights are adjusted by at least 5 cm. It should be understood that the heights adjustments obtained by the actuator may be above an adjustment threshold at at least some points of the bottom of the media stack, such adjustment threshold exceeding a dimensional tolerance of the media positioning arrangement of the top feeder.

Figure 2A:
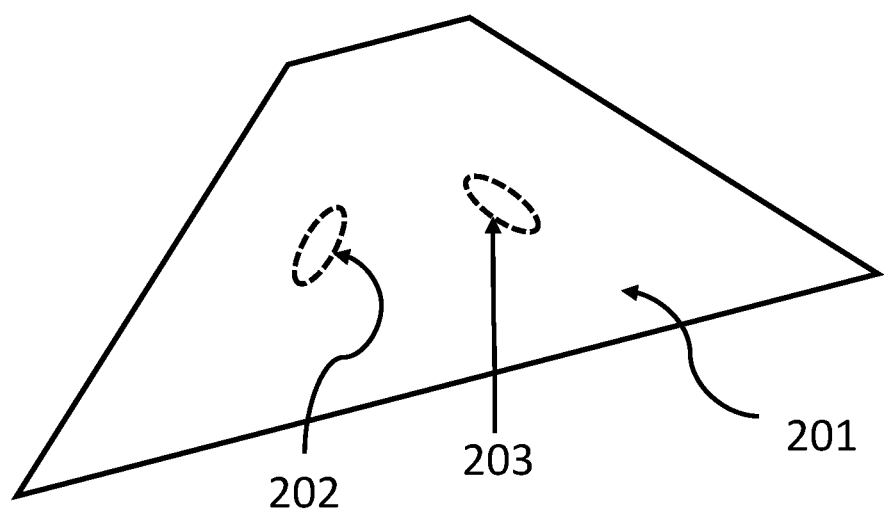
FIG. 2A-B are schematic diagrams of a first example top sheet.
Figure 2B:
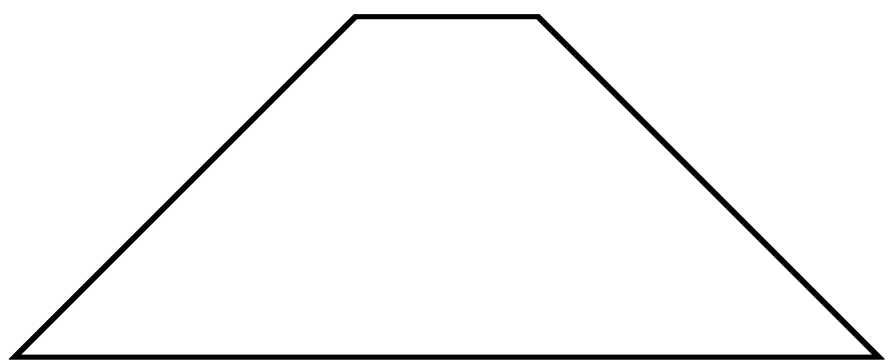

Example leveling system 100 comprises a controller 105. The controller 105 is configured to select, based on the three-dimensional image, adjustments to the heights for improving leveling of at least one of the media positioning regions. Such selection should be understood as a selection aiming at levelling the top sheet sufficiently to be appropriately placed in relation to the media positioning arrangement of the top feeder. In some examples, the three-dimensional image is compared to a theoretical horizontal plane, whereby deviations from the horizontal plane are identified by the controller, the deviations being compensated by the adjustments. In some cases, the deviations are partially compensated by the adjustments. For example, in case of a curved top sheet, changing its orientation alone does not make the surface of the stack planar. Still, it was indeed found that such partial compensation in many cases makes a difference allowing a top sheet to be successfully fed to a printer. The controller 105 is to control the actuator to implement the adjustments. The controller is configured to exchange electrical signals with the detector and the actuator. In some examples examples the controller is wirelessly connected to one or more of the detector and actuator. In some examples the controller is connected to one or more of the detector and actuator by a wire or a cable. The controller may comprise a processor and a machine-readable storage medium such as a data memory or data storage coupled to the processor. In some examples, the controller further comprises a network interface to receive data from a network. The machine-readable storage medium may comprise an instruction set to cooperate with the processor and the storage to process data. A processor may comprise electronic circuits for computation managed by an operating system FIG. 2A illustrates an example view of the top sheet of the stack from one of points suitable for placing the detector 101. Such view corresponds to a top sheet 201, the top sheet 201 comprising media positioning regions 202 and 203. The representation is in this example a three dimensional representation of a rectangular sheet. However, in general, media sheets may take other shapes. In this example, media positioning regions 202 and 203 are media pick up areas, since they correspond to areas on which a media positioning arrangement such as a vacuum gripper may attempt to adhere to top sheet 201 in order to insert top sheet 201 in the top feeder (not illustrated). In this example, media positioning region 202 is lower than media positioning region 203. In this example, a maximum of differences between levels of various points within media pick up areas may be determined by the controller, whereby such maximum difference would, in this case, be a height difference between a point in region 202 and another point in region 203. Such maximum difference should be understood as being a relative maximum difference between points being considered, and not necessarily an absolute maximum difference between any point on the top sheet. In this example, the adjustments improving leveling of at least one of the media positioning regions are adjustments reducing the maximum of differences between levels of the various points within media pick up areas considered. Such adjustment leads to changing an orientation of the top sheet to a more levelled one, as illustrated in FIG. 2B.

Figure 3A:
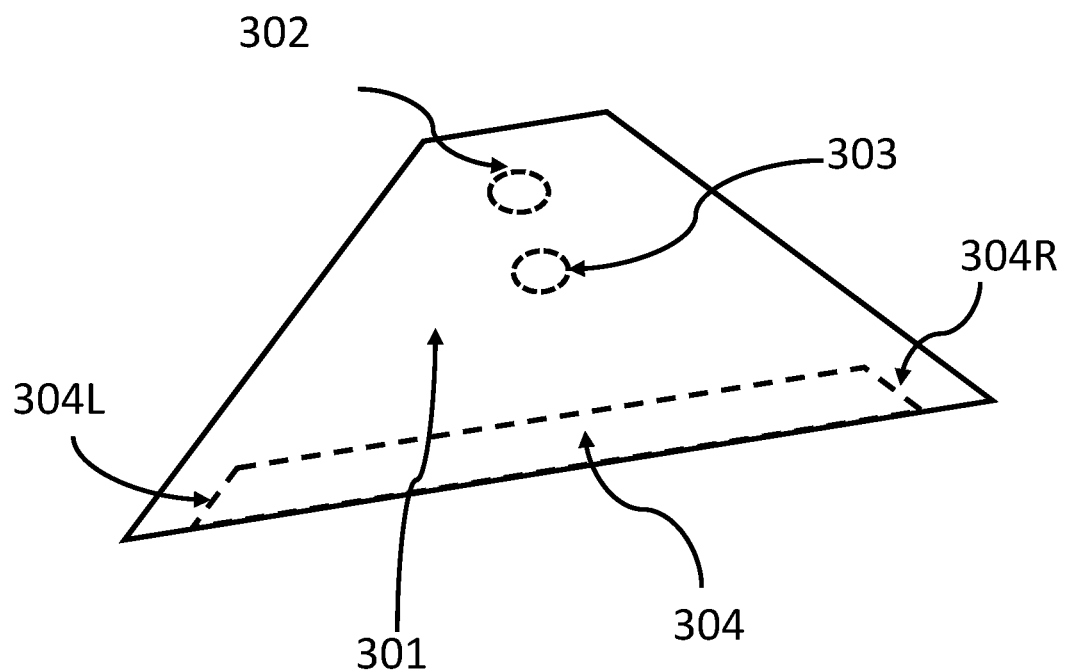
FIG. 3A-B are schematic diagrams of a second example top sheet.
Figure 3B:
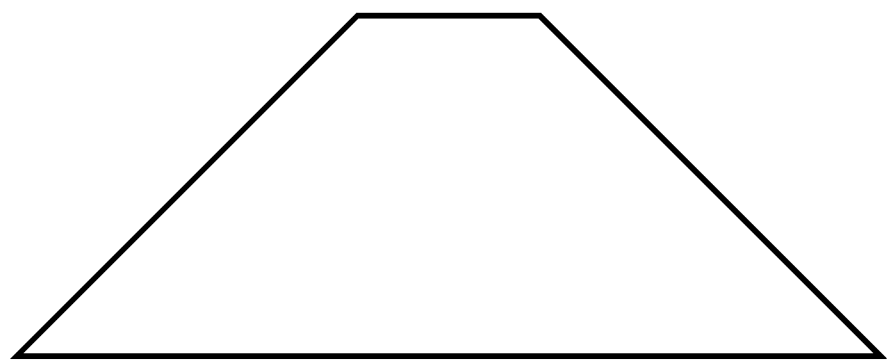

FIG. 3A illustrates another example view of the top sheet of the stack from one of points suitable for placing the detector 101. Such view corresponds to a top sheet 301, which in this example comprises media positioning regions 302, 303 and 304. The representation is in this example a three dimensional representation of a rectangular sheet. The media positioning regions 302 and 303 may be media pick up areas. The media positioning region 304 corresponds to an area in the proximity of a leading edge, on which a media positioning arrangement such as a roller may attempt to roll top sheet 301 in the top feeder (not illustrated), or which has to fit into an input window (not illustrated) of the media pick up arrangement of the top feeder after the top sheet is taken at media positioning regions 302 and 303 and is moved downstream on its route to a printer (not illustrated). In this example, heights of points in the media positioning region 304 are too different: points close to the left edge 304L of the region 304 are substantially lower than points close to the right edge 304R of the region 304. In this example, the controller may proceed with adjustments aligning heights of the leading edge region of the top sheet for fitting the top sheet into an input window of the media pick up arrangement of the top feeder. Such adjustment leads to changing an orientation of the top sheet to a more levelled one as illustrated in FIG. 3B.

In the above and other examples, for the leading edge region to be indicative of the location of the leading edge, the leading edge region may be a region of the top sheet of a width not less than a width W, lying along and comprising the leading edge of the top sheet. The width W can be larger than a depth resolution d of the detector 101. In some examples, the width W is larger than 3d. In some examples, the width W is larger than 10d. However, in some examples, the leading edge region is indicative of the location of the leading edge, while including the leading edge of the top sheet merely in part. In some other examples, the leading edge region may be indicative of the location of the leading edge, while not including any part of the leading edge.

Figure 4A:
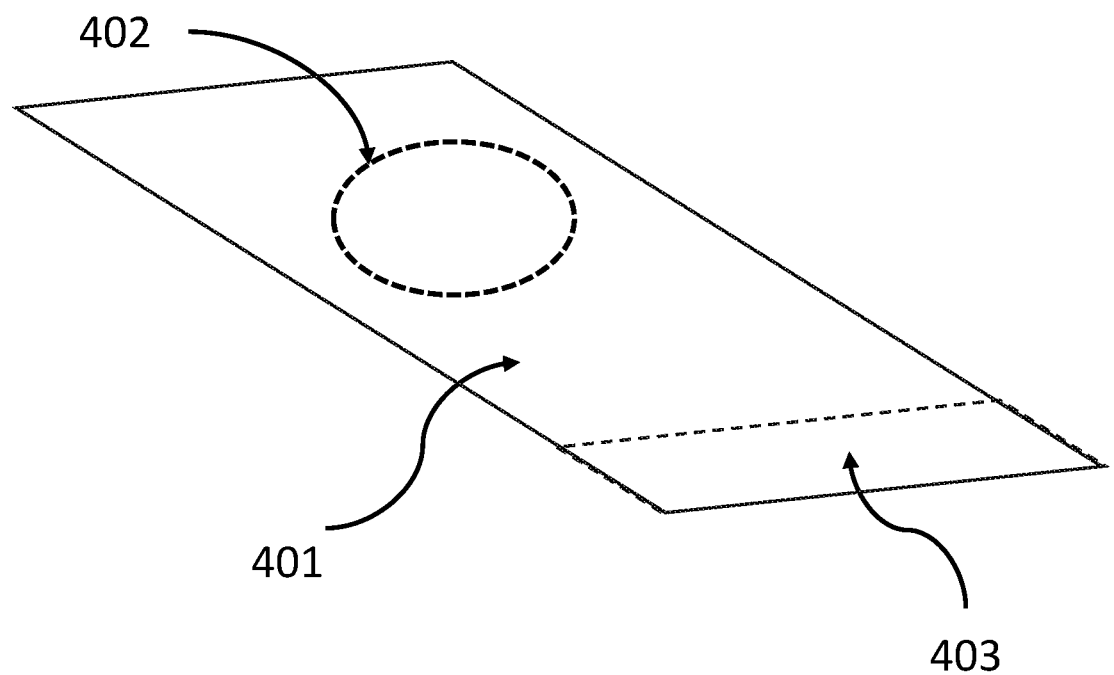
FIG. 4A-B are schematic diagrams of a third example top sheet.
Figure 4B:
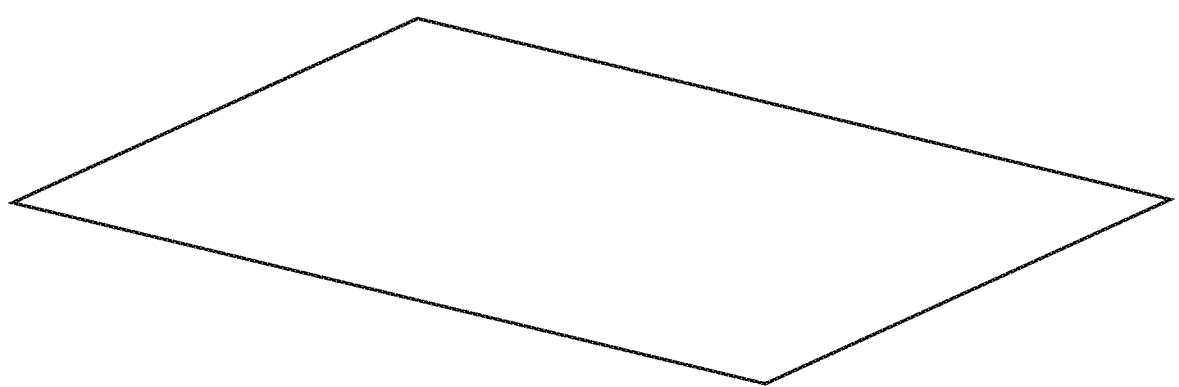

FIG. 4A illustrates another example view of the top sheet of the stack from another of points suitable for placing the detector 101. Such view corresponds to a top sheet 401, which in this example comprises media positioning regions 402 and 403. The representation is in this example a three dimensional representation of a rectangular sheet. The media positioning region 402 may be a media pick up area. The media positioning region 403 corresponds to an area in the proximity of a leading edge, on which a media positioning arrangement such as a roller may attempt to roll top sheet 401 in the top feeder (not illustrated), or which has to fit into an input window (not illustrated) of the media pick up arrangement of the top feeder after the top sheet is taken at media positioning region 402 and is moved downstream on its route to a printer (not illustrated). In this example, heights of points in the media positioning region 403 are too low with respect to points on the top sheet outside the media positioning region 403, for example points in the media positioning region 402. In this example, the controller may proceed with adjustments aligning heights of the leading edge region of the top sheet for fitting the top sheet into an input window of the media pick up arrangement of the top feeder. Such adjustment leads to changing an orientation of the top sheet to a more appropriately levelled one as illustrated in FIG. 4B. Changing the orientation of the top sheet between FIGS. 4B and 4A includes changing a different angle than between FIGS. 3B and 3A. Also, just for example, changing the orientation of the top sheet between FIGS. 4B and 4A includes changing more than one angle. It is understood that the orientation is changed at the bottom of the media stack, and this change is translated to the top sheet, possibly with a displacement.

Figure 5A:
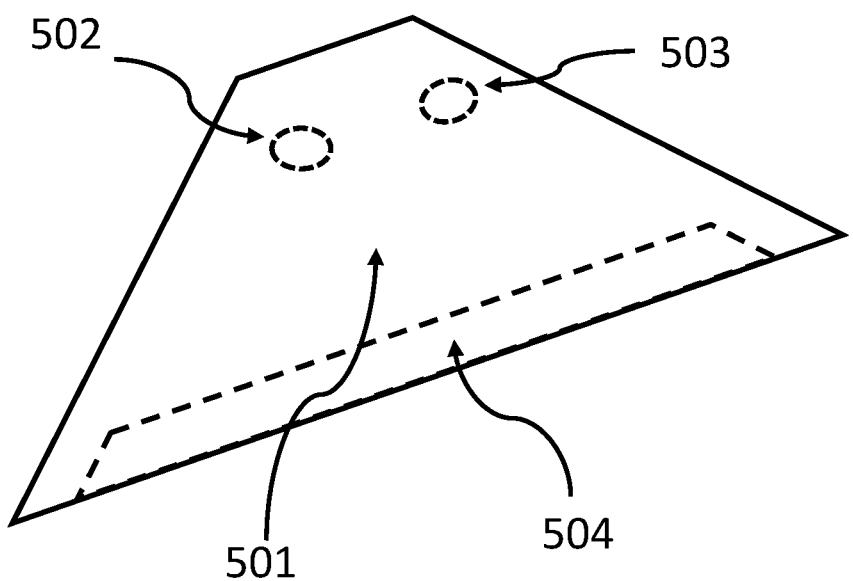
FIG. 5A-B are schematic diagrams of a fourth example top sheet.
Figure 5B:
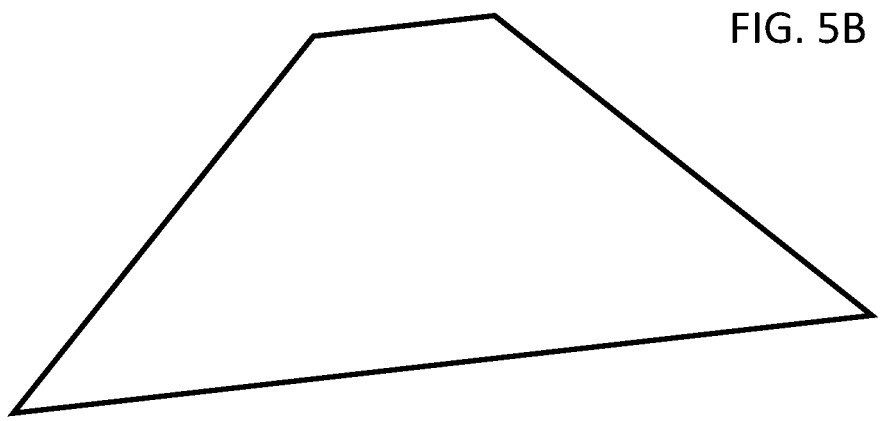

FIG. 5A illustrates another example view of the top sheet of the stack from another of points suitable for placing the detector 101. Such view corresponds to a top sheet 501, which in this example comprises media positioning regions 502, 503 and 504. The representation is in this example a three dimensional representation of a rectangular sheet. The media positioning regions 502 and 503 are media pick up areas. The media positioning region 504 corresponds to an area in the vicinity of a leading edge, on which a media positioning arrangement such as a roller may attempt to roll top sheet 501 in the top feeder (not illustrated), or which has to fit into an input window (not illustrated) of the media pick up arrangement of the top feeder after the top sheet is taken at media positioning regions 502 and 503 and is moved downstream on its route to a printer (not illustrated). In this example, media positioning region 502 is lower than media positioning region 503; and the leading edge region 504 is too high. In this example, the controller may proceed with adjustments making a maximum of differences between levels of various points within media pick up areas 502 and 503 be smaller than a threshold, and making the leading edge region 504 of the top sheet to fit into an input window of the media pick up arrangement of the top feeder. Such adjustment leads to changing an orientation of the top sheet to an improved one as illustrated in FIG. 5B.

Figure 6A:
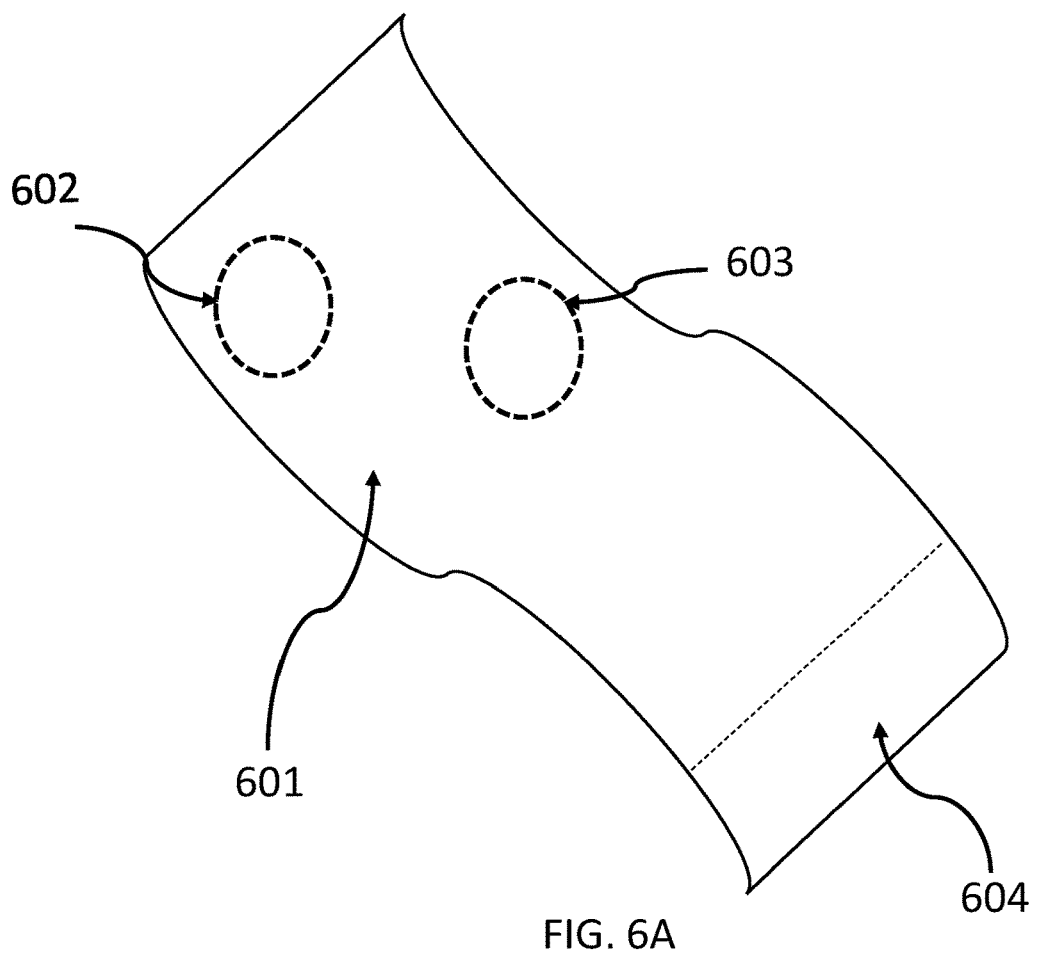
FIG. 6A-B are schematic diagrams of a fifth example top sheet.
Figure 6B:
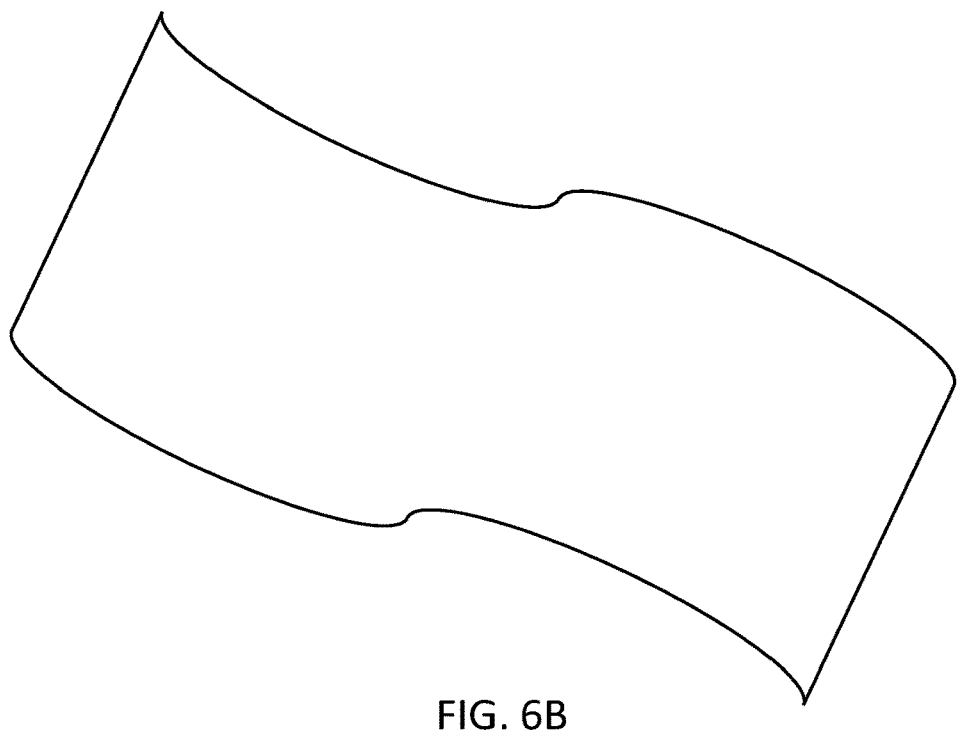

FIG. 6A illustrates another example view of the top sheet of the stack from another of points suitable for placing the detector 101. Such view corresponds to a top sheet 601, which in this example comprises media positioning regions 602, 603 and 604. The representation is in this example a three dimensional representation of a rectangular sheet, having some warps. The media positioning regions 602 and 603 are media pick up areas. The media positioning region 604 corresponds to an area in the vicinity of a leading edge, on which a media positioning arrangement such as a roller may attempt to roll top sheet 501 in the top feeder (not illustrated), or which has to fit into an input window (not illustrated) of the media pick up arrangement of the top feeder after the top sheet is taken at media positioning regions 602 and 603 and is moved downstream on its route to a printer (not illustrated). In this example, media positioning region 602 is lower than media positioning region 603; and the leading edge region 604 is too high. In this example, the controller may proceed with adjustments making a maximum of differences between levels of various points within media pick up areas 602 and 603 be smaller than a threshold, and making the leading edge region 604 of the top sheet to fit into an input window of the media pick up arrangement of the top feeder. Such adjustment leads to changing an orientation of the top sheet to an improved one as illustrated in FIG. 6B.

In all of the above examples, the controller can be modified to select adjustments increasing an overall chance of the top sheet to be successfully picked up by a media pick up arrangement of the media positioning arrangement and be input into an input window of the media pick up arrangement of the top feeder.

In some examples, the media positioning arrangement is setup for moving a top sheet of a media stack installed into the top feeder to the printer. According to the present disclosure, leveling of at least one of media positioning regions corresponding to the media positioning arrangement on the top sheet can be improved, for increasing the chance that the media positioning arrangement will correctly implement such a move.

In some examples, the media positioning arrangement has a media pick up arrangement. The media pick up arrangement may be an arrangement which can move toward the media stack along a certain path, for example along a direction of gravity or a direction inclined at a relatively small angle with respect the direction of gravity. In this disclosure, a small angle should be considered as an angle of less than 15 degrees, in some case less than 10 degrees. This media pick up arrangement can move up, after picking up the top sheet of the media stack, to lift the top sheet up. Projections of the media pick up arrangement along its path on the top sheet correspond in some examples to at least one positioning region. In some examples these regions include two media positioning regions, hereinafter called R1 and R2.

In some examples, if it follows from the three-dimensional image that the media position region R1 is further from the media pick up arrangement than the media position region R2, by a distance difference dH, the controller can determine that this distance difference has to be changed for improving the chance of successful pick up. In some cases, when the media pick up arrangement is so lowered that it touches the media position region R2 and cannot be moved any lower, it can happen that a certain distance would still separate the media pick up arrangement and the media position region R1. This distance can be estimated as dH, or in a different way. For example, this distance can be estimated using, for improving the accuracy, data regarding an effect of the media pick up arrangement in the lowered state on a geometry of the media stack (for example, on a position of the top sheet and an orientation of the top sheet). Hence, the controller can decide if the distance which would remain between the media pick up arrangement the media position region R1 is so large that it lowers a probability that the media pick up arrangement will lift the whole top sheet up (for example, the media pick up arrangement may have a vacuum gripper, which lifting force would become too small at this distance). For example, the controller can decide if this distance lowers the probability below a threshold of acceptance. The controller can take a respective mechanic and geometric situation into account to select how to adjust heights at the bottom of the stack to reduce this distance difference when such a reduction can increase the chance that the media pick up arrangement will lift the top sheet. Alternatively, in some cases, this situation may be presolved, with results stored in memory available to the controller. For example, there can be a record that for the distance difference dH a height at the bottom of the media stack at the point where the actuator is installed has to be adjusted by increasing this height by dHB. Also, such a record can be prepared on the basis of the respective statistical data. Consequently, in some examples, the controller can control the actuator to adjust the height, at that point of the stack which is contacted by the actuator, by dHB.

In another example of a leveling system according to the present disclosure the leveling system includes a detector, an actuator, and a controller, the top feeder including a media positioning arrangement setup for moving a top sheet of a media stack installed into the top feeder to the printer. Leveling of at least one of media positioning regions corresponding to the media positioning arrangement on the top sheet can be improved, for increasing the chance that the media positioning arrangement will correctly implement such a move.

In some examples, the top feeder has a media positioning arrangement including a media pick up arrangement to which media pick up areas R1 and R2 correspond. In some of such examples, the media positioning arrangement also includes an input window of the top feeder. A media positioning region R3 has to fit into the input window after the top sheet is taken by the media pick up arrangement and is moved downstream on its route to the printer. In this example, the media positioning region R3 is a leading edge region of the top sheet. As in other examples, the controller can control the actuator to adjust the height, at that point of the media stack 110 which is contacted by the actuator. In this example, the adjustments can be selected to improve leveling of the leading edge region R3 with respect to the input window of the top feeder. Additionally or alternatively, the adjustments can be selected to improve leveling of points within the media pick up region R1, to improve the chance of successful pick-up. Additionally or alternatively, the adjustments can be selected to improve leveling of points within any of the media pick up regions R1 and R2, to improve the chance of successful pick-up. In this example, if potential adjustments improving the chance of fitting the leading edge of the top sheet into the input window decrease the chance of successful pick-up; or if potential adjustments improving the chance of successful pick-up decrease the chance of successfully fitting the leading edge of the top sheet into the input window, those adjustments can be selected which improve an overall chance of successfully moving the top sheet along the whole route inside the feeder. In some examples the media position regions can include the leading edge region and more than one media pick up area. For example, the leveling system can be setup to select adjustments based on the 3D image of three media positioning regions R1, R2 and R3 on the top sheet of the media stack: R1 and R2 being media pick up areas, and R3 being a leading edge area.

Alternatively, the number of media positioning regions being media pick up areas which leveling would be improved by the leveling system can be zero. For example, the leveling system can be dedicated to improving the leveling of a leading edge region such as the leading edge region R3. In other words, it can happen that the top sheet includes a media pick up area, corresponding to a media pick up arrangement of the media positioning arrangement, but the three-dimensional image does not have to include this media pick area since the leveling system can be dedicated to the leading edge.

Also, alternatively, the number of media positioning regions being media pick up areas which leveling would be improved by the leveling system can be one, and the leveling system does not improve the leveling of the leading edge region. For example, the leveling system can be dedicated to improving the leveling of a media pick up region, as R1, because there may be no other pick up regions or because they cause less failures. In such a case, the controller can select adjustments to heights of different points of the bottom of the media stack for improving leveling of the one media positioning region.

In some examples, the leveling system can be modified so that the controller of the leveling system would be setup for deciding if an improvement of an overall chance to successfully move the top sheet by the feeder to the printer can be achieved by adjusting heights of different points at the bottom of the stack, with respect to each other. The possible adjustments which can be considered by the controller, include those which change leveling of the leading edge region and those, which change leveling of any of the media pick up areas. However, alternatively, the controller of the leveling system can be more dedicated and setup for deciding if an improvement of a chance for the top sheet to successfully pass a part of the route in the top feeder, from the stack to the printer, can be achieved by adjusting heights of different points at the bottom of the stack, with respect to each other.

Hence, for example, in at least some cases in which the media positioning regions include at least two media pick up areas, the leveling system may be modified, alternatively, to select adjustments for reducing a maximum of differences between levels of various points within the media pick up areas.

Also, in at least some examples, in which the media positioning regions include at least two media pick up areas, the leveling system may be modified, alternatively, to select adjustments for improving mutual leveling of the media pick up areas.

In at least some examples, in which the media positioning regions include the leading edge region, the leveling system may be modified rather to select adjustments aligning heights of the leading edge region of the top sheet for fitting the top sheet into an input window of the media pick up arrangement of the top feeder.

In at least some examples, in which the media positioning regions include the leading edge region and at least one media pick up area, the leveling system may be modified, alternatively, to select adjustments increasing an overall chance of the top sheet to be successfully picked up by the media pick up arrangement of the media positioning arrangement and be input into the input window of the media pick up arrangement of the top feeder.

In at least some examples, in which the media positioning regions include at least two media pick up areas and the leading edge region, the leveling system may be modified, alternatively, to select adjustments making a maximum of differences between levels of various points within the media pick up areas be smaller than a threshold of acceptance, and making the leading edge region of the top sheet to fit into the input window of the media pick up arrangement of the top feeder.

In at least some cases, the media positioning arrangement can include at least one of a cardboard pick up arrangement, a gripper, a suction cup, a suction fan, a vacuum belt, a pickup roller, and an input window. In at least some cases, where the media positioning arrangement includes a media pick up arrangement, this media pick up arrangement can include at least one of a cardboard pick up arrangement, a gripper, a suction cup, a suction fan, a vacuum belt, a pickup roller.

In some examples, the actuator may be setup to push on a certain point at the bottom of the media stack directly.

Also, in at least some other examples described above the actuator may be setup to push on a certain point at the bottom of the media stack directly.

Alternatively, in at least some of the examples above, the top feeder can have a stage for the stack to lie on, and the actuator can adjust heights of different parts of the stage to change an orientation of the stage and of the media stack.

The actuator can have an actuating element interacting with the stage by at least one of pulling and pushing the stage when needed, to change its orientation. The actuating element can be setup to merely touch the stage or, if pulling is used, it can be coupled to the stage. For example, an edge of the stage can lie on an actuating element, as a stack lies on the actuator. The edge can be any of a leading edge (corresponding to the leading edge of the top sheet), a trailing edge, a left edge, and a right edge (with respect to the point of view of the detector). For another example, the actuating element can be positioned so that it would touch at least one of a bottom of the stage and a top of the stage, but not the leading, trailing, left or right edge.

In some examples, a stage is interacting, respectively, with a different actuating element. The media stack may be lying on the stage. In some examples, the actuating element is under the stage, and an edge of the stage is merely lying on it. The actuating element can push the edge of the stage up, changing an orientation of the stage. In another example, the actuating element interact with a side of the stage. In another example, the actuating element is placed above the stage.

The actuator can be of any type allowing changing the orientation of the stage along at least one of its axes orthogonal to the direction of gravity (or a direction inclined at a small angle with respect to the direction of gravity, if the stage is oriented non-horizontally). In some examples, such angle is limited to 15 degrees to reduce a risk of having the stack collapsing. For example, the actuator can include an actuating element for changing an orientation of the stage with respect to an axis extending from the leading edge of the stage to the trailing edge of the stage. Such an axis does not have to pass through a center of the stage. However, the actuator can also be setup to include at least two actuating elements symmetrically located with respect to such an axis, when it lies in a middle region of the stage. These actuating elements can be cushions positioned under the stage.

In another example, additionally or alternatively, the actuator can include an actuating element for changing an orientation of the stage with respect to an axis extending along the stage and perpendicular to the axis extending from the leading edge of the stage to the trailing edge of the stage. Similarly, such an axis does not have to pass through a center of the stage. The actuator can also be setup to include at least two actuating elements symmetrically located with respect to such an axis, when it lies in a middle region of the stage. These actuating elements can be cushions positioned under the stage.

In some further examples, the actuator can include at least three actuating elements for changing the orientation of the stage with respect to any of: the axis extending from the leading edge of the stage to the trailing edge of the stage; the axis extending along the stage and perpendicular to the axis extending from the leading edge of the stage to the trailing edge of the stage; and both these axes. The at least three actuating elements can be positioned at sides of a right angle with a vertex at one of the at least three actuating elements. These actuating elements can be cushions positioned under the stage.

In some further examples, the actuator can include at least four actuating elements, for changing the orientation of the stage with respect to any of: the axis extending from the leading edge of the stage to the trailing edge of the stage; the axis extending along the stage and perpendicular to the axis extending from the leading edge of the stage to the trailing edge of the stage; and both these axes. The at least four actuating elements can be positioned at sides of a rectangle with vertices at four of the at least four actuating elements. These actuating elements can be cushions positioned under the stage.

Additionally or alternatively, the actuator can include an actuating element for changing an orientation of the stage with respect to a direction of gravity.

Various actuating elements do not have to be cushions. For example, an actuating element can be a ball joint.

In at least some of the above examples, the stage may be a part of a conveyor of the top feeder used at least for lifting up the stack towards the media pick up arrangement of the media positioning arrangement (even in the case if the leveling system is dedicated to improving the leveling of the leading edge region). The actuator, for example, at least one its actuating element, may be coupled to the stage of the conveyor to move when the stage moves. In some examples, the actuator may move in a range of at least one meter.

In at least some of the above examples, the controller may select the adjustments to the heights of different points of the bottom of the media stack based on a current position of the actuator (i.e. the stage). For example, when the stage is further from the pick up arrangement, a smaller change in the orientation of the stage (i.e. a smaller change of a respective angle) may be needed for leveling media pick up areas being at distances differing by the distance difference dH from the media pick up arrangement.

Additionally or alternatively, in at least some of the above examples, the controller may select the adjustments based on a height of the media stack.

In at least some of the above examples, the detector may include at least one of a 3D camera and two 2D cameras.

In at least some of the above examples, the leveling system may further include a light source for directing a patterned radiation, with a pattern allowing the three-dimensional imaging, onto at least one media positioning region whose leveling the leveling system is designed to improve.

In at least some of the above examples, the detector may generate the three-dimensional image including more than the at least one media positioning region. The controller may locate in the three-dimensional image at least one part corresponding to the at least one media positioning region of the top sheet.

In at least some of the above examples, where there are at least two media pick up areas, two media pick up areas are in mutual symmetry with respect to an axis extending from the leading edge of the top sheet to a trailing edge of the top sheet.

In at least some the above examples, there are modifications in which the detector, the actuator and the controller may operate iteratively, and the adjustments improving leveling of at least one of the media positioning regions for the top sheet are overall adjustments at an end of the iterative process with respect to a start of the iterative process.

According to the present disclosure, each of the above examples may also be implemented with the printer including the top feeder and the leveling system for the top feeder, whereby the top feeder includes the media positioning arrangement. The leveling system may include:

a depth camera for generating the three-dimensional image including media positioning regions corresponding to the media positioning arrangement on the top sheet of the media stack installed into the top feeder;

the actuator for changing heights of different points of the bottom of the media stack; and the controller for:

computing, in function of the three-dimensional image, changes to the heights for improving leveling of at least one of the media positioning regions; and controlling the actuator to implement the adjustments.

Figure 7A:
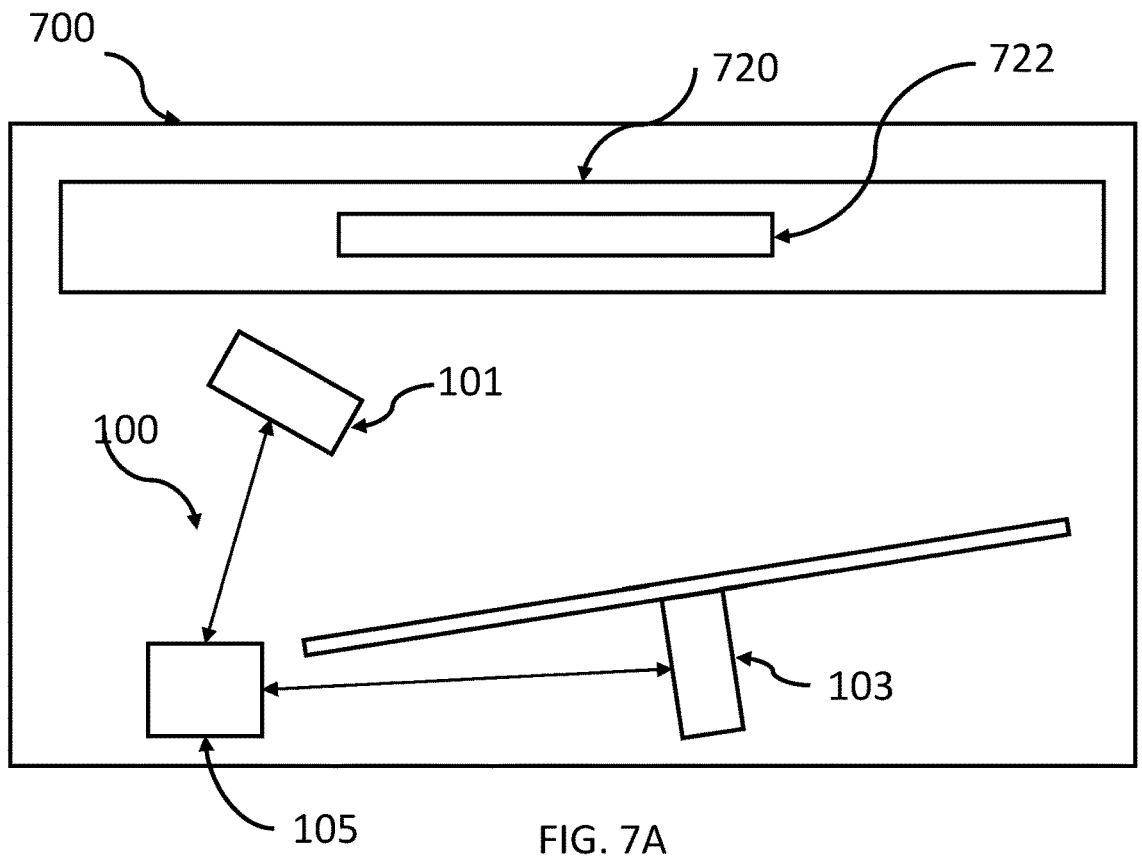
FIG. 7A-B are schematic diagrams of an example printer.

FIG. 7A illustrates an example printer. In this example, a printer 700 is configured for printing on a media stack. The printer can for example be a digital press, a digital printer, an ink jet printer, a flexography (flexo in a short form) printer, a solid ink printer, a lithography ("litho" or offset" in a short form) printer, a gravure printer, a rotogravure printer, a screen printer, a silkscreen printer, a laser printer, a light emitting diode (LED) printer, or any other type of printer. In some examples, the printer may be of a type used in packaging. The printer may be configured for printing on corrugated boards, cardboards, cartons or the like. Also, the printer may be configured for printing on micro flute materials, plastic, metallic films, cellophane, paper and media of other types, for example, used in packaging. The printer may be configured for printing with a speed of at least 0.3 linear meters per second, or of at least 1 linear meter per second, or differently. Also, the printer may be configured for printing with a speed of up to 4 linear meters per second, or of up to 15 linear meters per second, or differently. The printer may be a color printer, a monochrome printer, a "black and white" printer, or a printer of a different type.

Printer 700 comprises a top feeder 720. Printer 700 may control the top feeder, by exchanging relevant control signals. For example, printer 700 may control the top feeder to make it pass media sheets with a certain speed. For example, this speed may be measured in number of media sheets per second.

The top feeder 720 may be of any type compatible with the printer 700. For example, the top feeder may be of a type capable of feeding to the printer corrugated boards, cardboards, cartons or the like. Also, the top feeder may be of a type capable of feeding to the printer micro flute materials, plastic, metallic films, cellophane, paper and media of other types, for example, used in packaging.

The top feeder 720 comprises a media positioning arrangement 722. Top feeder 720 may control the media positioning arrangement 722, by exchanging relevant signals. For example, top feeder 720 may control the media positioning arrangement 722 to take a media sheet from the top of the media stack. The media positioning arrangement 722 may have any configuration indirectly described in the disclosure of the various levelling systems above. For example, it may comprise at least one of a media pick up arrangement and an input window. Similarly, this media pick up arrangement and this input window may have a configuration indirectly described in the disclosure of the various levelling systems above. Such example printer further includes elements already described in the context of FIG. 1.

Figure 7B:
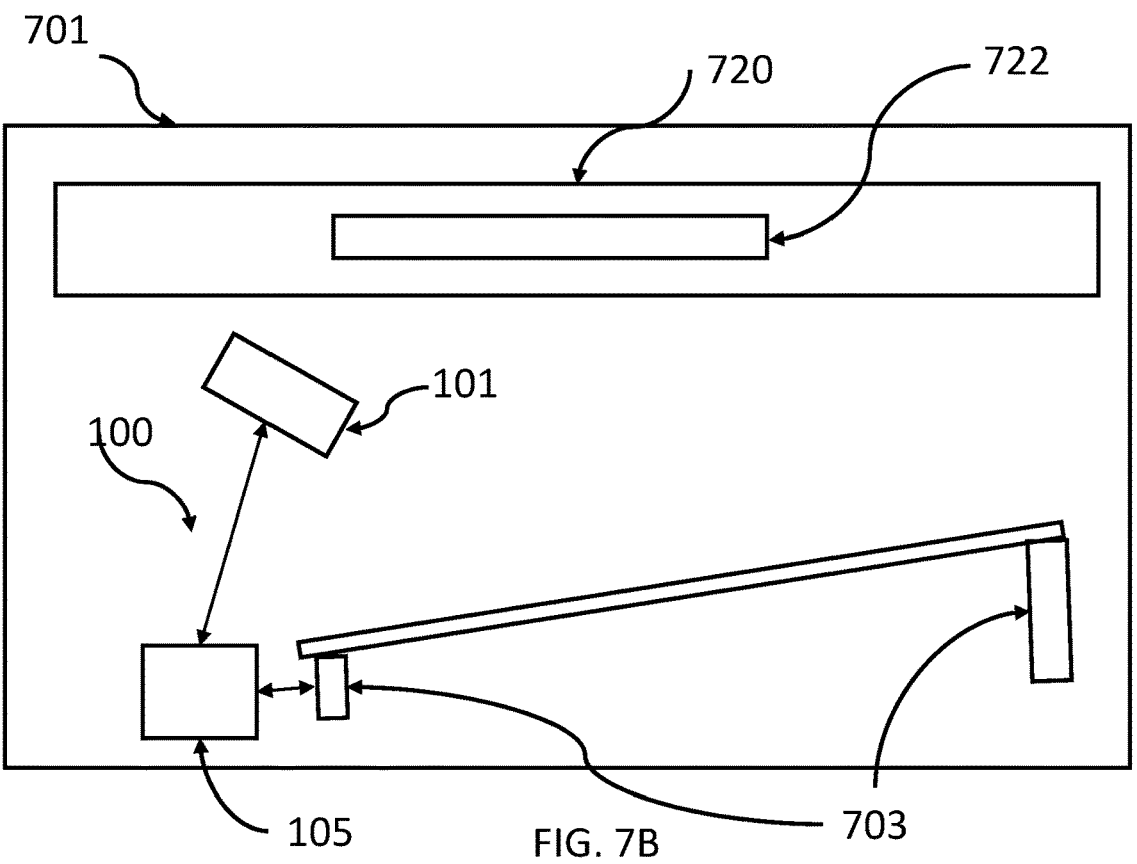

FIG. 7B illustrates another example printer 701. Example printer 701 comprises elements described in the context of example printer 700, and comprises an actuator 703 having a plurality of actuating elements as described in some examples.

Figure 8:
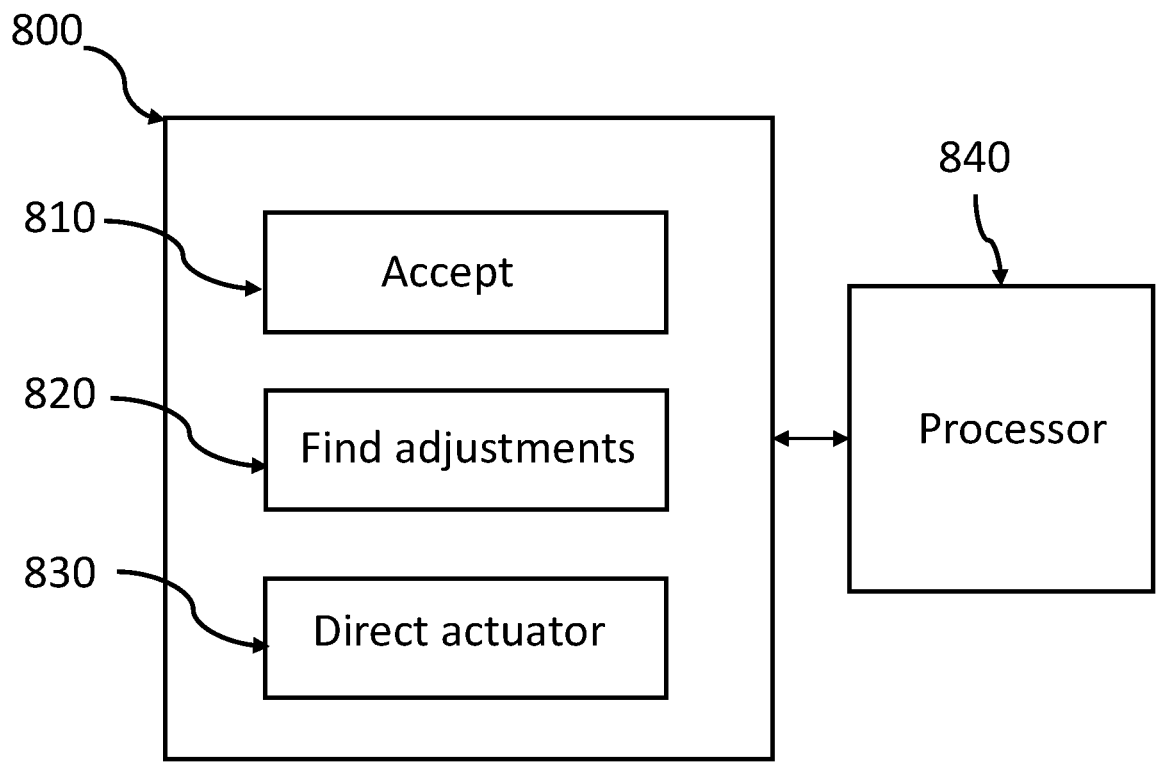
FIG. 8 is a schematic diagram of an example transitory machine-readable storage medium.

According to the present disclosure, any of the above examples may be implemented via non-transitory machine-readable storage medium encoded with instructions executable by a processor. Machine-readable storage may be any electronic, magnetic, optical, or other physical storage device that stores executable instructions. Thus, machine-readable storage medium may be, for example, Random Access Memory (RAM), an Electrically-Erasable Programmable Read-Only Memory (EEPROM), a storage drive, an optical disc, and the like. FIG. 8 is an example of such non-transitory machine-readable storage medium 800 encoded with instructions executable by a processor 840, for example a processor of controller 105, the machine-readable storage medium 800 comprising respective instructions 810 to accept a three-dimensional image comprising a media positioning region corresponding to a media positioning arrangement on a top sheet of a media stack installed into a top feeder of a printer, instructions 820 to find, based on the three-dimensional image, adjustments to heights of different points of the bottom of the media stack for improving leveling of the media positioning region, and instructions 830 to direct an actuator to implement the adjustments.

In this case, the media positioning region may include a part being a leading edge region, as described above. Also, it may include a part or a plurality of parts being media pick up regions, as described above. When there are two or more parts, they may be separated by a certain distance.

Figure 9:
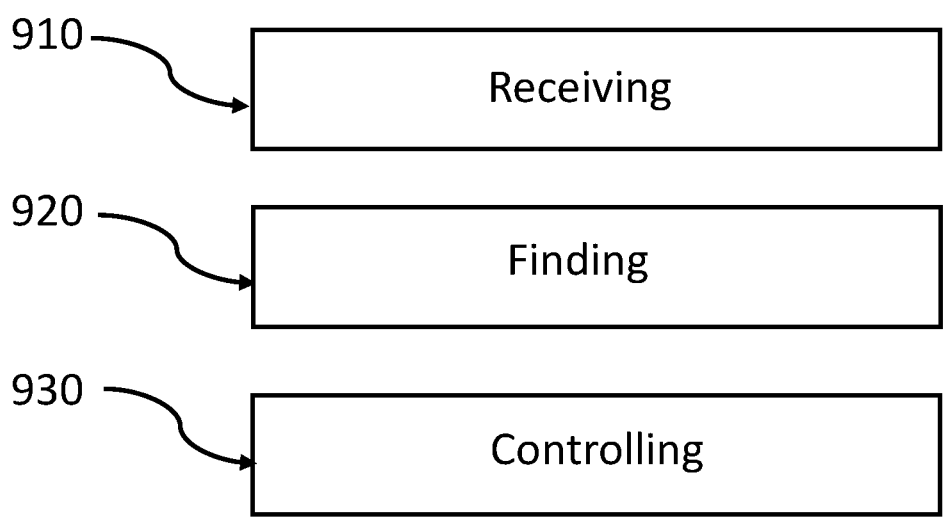
FIG. 9 is a schematic diagram of an example method.

FIG. 9 illustrates an example method to operate a leveling system as any of the example leveling systems hereby described. Such example method comprises, in block 910, receiving a three-dimensional representation comprising a media positioning region associated to a media positioning arrangement on a top sheet of a media stack placed on a top feeder of a printer, for example an example printer described hereby. Such example method further comprises, in block 920, finding, based on the three-dimensional representation, adjustments to heights of different points of the bottom of the media stack for improving leveling of the media positioning region. Such example method also comprises, in block 930, controlling an actuator to implement the adjustments. Referring back to FIG. 1A, 1B, 7A, 7B, or 8, controller 105, or an "Accept" module executing instructions 810 when executed by processor 840, may be responsible for implementing block 910. Referring back to FIG. 1A, 1B, 7A, 7B, or 8, controller 105, or a "Find adjustments" module executing instructions 820 when executed by processor 840, may be responsible for implementing block 920. Referring back to FIG. 1A, 1B, 7A, 7B, or 8, controller 105, or a "Direct actuator" module executing instructions 830 when executed by processor 840, may be responsible for implementing block 930.

What is claimed is:

1. A leveling system for a top feeder of a printer, the top feeder comprising a media positioning arrangement, the leveling system comprising:
    a detector configured to detect reflected light and generate a three-dimensional image comprising media positioning regions corresponding to the media positioning arrangement on a top sheet of a media stack installed into the top feeder;
    an actuator configured to adjust heights of different points of the bottom of the media stack; and
    a controller configured to:
        select, based on the three-dimensional image, adjustments to the heights for improving leveling of at least one of the media positioning regions; and
        control the actuator to implement the adjustments.

2. The leveling system according to claim 1, wherein the adjustments improving leveling of at least one of the media positioning regions are at least one of
    adjustments reducing a maximum of differences between levels of various points within media pick up areas;
    adjustments aligning heights of a leading edge region of the top sheet for fitting the top sheet into an input window of the top feeder; and
    adjustments making a maximum of differences between levels of various points within media pick up areas be smaller than a threshold, and making a leading edge region of the top sheet to fit into an input window of the top feeder.

3. The leveling system according to claim 1, according to at least one of:
    the media positioning arrangement comprises a media pick up arrangement to which media pick up areas correspond from the media positioning regions, and the adjustments are to improve mutual leveling of the media pick up areas; and
    the media positioning arrangement comprises an input window to which a leading edge region corresponds from the media positioning regions, and the adjustments are to improve leveling of the leading edge region with respect to the input window.

4. The leveling system according to claim 1, wherein the media positioning arrangement comprises at least one of a cardboard pick up arrangement, a gripper, a suction cup, a suction fan, a vacuum belt, a pickup roller, and an input window.

5. The leveling system according to claim 1, wherein the actuator is configured to adjust heights of different parts of a stage of the top feeder on which the stack is to lie to change an orientation of the stage and the media stack.

6. The leveling system according to claim 5, according to at least one of:
    the actuator comprises an actuating element configured to change an orientation of the stage with respect to an axis extending from a leading edge of the stage to a trailing edge of the stage;
    the actuator comprises an actuating element configured to change an orientation of the stage with respect to an axis extending along the stage and perpendicular to an axis extending from a leading edge of the stage to a trailing edge of the stage;
    the actuator comprises an actuating element configured to change an orientation of the stage with respect to a direction of gravity; the actuator comprises at least two actuating elements, symmetrically located with respect to an axis extending from a leading edge of the stage to a trailing edge of the stage;
    the actuator comprises at least three actuating elements, positioned at sides of a right angle with a vertex at one of the at least three actuating elements; and
    the actuator comprises at least four actuating elements, positioned at sides of a rectangle with vertices at four of the at least four actuating elements.

7. The leveling system according to claim 1, wherein the detector comprises at least one of a 3D camera and two 2D cameras.

8. The leveling system according to claim 1, further comprising a light source for directing a patterned radiation onto the media positioning regions, the pattern allowing the three-dimensional imaging.

9. The leveling system according to claim 1, wherein the media positioning regions comprise media pick up areas, and whereby the media pick up areas comprise two media pick up areas being in mutual symmetry with respect to an axis extending from a leading edge of the top sheet to a trailing edge of the top sheet.

10. The leveling system according to claim 1, wherein the detector is configured to generate the three-dimensional image comprising more than the at least one media positioning region, and the controller is configured to locate in the three-dimensional image at least one part corresponding to the at least one media positioning region of the top sheet.

11. The leveling system according to claim 1, with at least one of the following the controller is configured to select the adjustments based on a height of the media stack; and the detector, the actuator and the controller are configured to operate iteratively, and wherein the adjustments improving leveling of at least one of the media positioning regions for the top sheet are overall adjustments at an end of the iterative process with respect to a start of the iterative process.

12. The leveling system according to claim 1, wherein the actuator is further configured to be coupled to a stage configured to lift the media stack, and is configured to move when the stage moves, and the controller is configured to select the adjustments based on a current position of the actuator.

13. The leveling system according to claim 1, wherein the actuator is configured to move in a range of at least one meter.

14. A printer comprising a top feeder and a leveling system for the top feeder, the top feeder comprising a media positioning arrangement, the leveling system comprising:

a depth camera configured to generate a three-dimensional image comprising media positioning regions corresponding to the media positioning arrangement on a top sheet of a media stack installed into the top feeder;

an actuator configured to change heights of different points of the bottom of the media stack; and a controller configured to:

compute, in function of the three-dimensional image, changes to the heights for improving leveling of at least one of the media positioning regions; and control the actuator to implement the adjustments.

15. A non-transitory machine-readable storage medium encoded with instructions executable by a processor, the machine-readable storage medium comprising:

instructions to accept a three-dimensional image comprising a media positioning region corresponding to a media positioning arrangement on a top sheet of a media stack installed into a top feeder of a printer;

instructions to find, based on the three-dimensional image, adjustments to heights of different points of the bottom of the media stack for improving leveling of the media positioning region; and instructions to direct an actuator to implement the adjustments.

* * * * *